US009168457B2

(12) United States Patent
Speck et al.

(10) Patent No.: US 9,168,457 B2
(45) Date of Patent: Oct. 27, 2015

(54) SYSTEM AND METHOD FOR RETAINING SYSTEM STATE

(75) Inventors: John Speck, Sunnyvale, CA (US); Stephen G. Perlman, Palo Alto, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 249 days.

(21) Appl. No.: 13/016,794

(22) Filed: Jan. 28, 2011

(65) Prior Publication Data

US 2012/0066405 A1   Mar. 15, 2012

Related U.S. Application Data

(60) Provisional application No. 61/382,842, filed on Sep. 14, 2010.

(51) Int. Cl.
*G06F 15/16* (2006.01)
*A63F 13/30* (2014.01)

(52) U.S. Cl.
CPC ........... *A63F 13/12* (2013.01); *A63F 2300/407* (2013.01); *A63F 2300/534* (2013.01); *A63F 2300/535* (2013.01); *A63F 2300/538* (2013.01); *A63F 2300/554* (2013.01); *A63F 2300/636* (2013.01)

(58) Field of Classification Search
CPC .................. H04L 29/06027; H04L 29/06462; H04L 29/06034; A63F 2300/554
USPC ......................................................... 709/231
See application file for complete search history.

(56) References Cited

U.S. PATENT DOCUMENTS

| 4,539,706 A | 9/1985 | Mears et al. |
| 4,573,074 A | 2/1986 | Alaria et al. |
| 4,616,263 A | 10/1986 | Eichelberger |
| 5,058,199 A | 10/1991 | Grube |
| 5,129,096 A | 7/1992 | Burns |

(Continued)

FOREIGN PATENT DOCUMENTS

| EP | 0554586 | 12/1992 |
| EP | 1094642 | 4/2001 |

(Continued)

OTHER PUBLICATIONS

Patent Cooperation Treaty International Search Report and Written Opinion for foreign counterpart Patent Application Serial No. PCT/US2011/051368, mailed Nov. 28, 2011, 14 pages.

(Continued)

*Primary Examiner* — Andrew Nalven
*Assistant Examiner* — Khang Do
(74) *Attorney, Agent, or Firm* — Martine Penilla Group, LLP (57) ABSTRACT

An apparatus and method are described for retaining system state of an online application such as a video game. For example, a method according to one embodiment comprises: executing a application on a server in response to user input from a client; transmitting video generated by the application over a network connection from the server to the client; detecting that the network connection has become unusable or impaired; responsively pausing the execution of the application from a current point of execution; and resuming the execution of the application from the current point of execution upon detecting that the network connection has become usable or unimpaired.

15 Claims, 3 Drawing Sheets

(56) References Cited

U.S. PATENT DOCUMENTS

| | | |
|---|---|---|
| 5,222,246 A | 6/1993 | Wolkstein |
| 5,357,604 A | 10/1994 | San et al. |
| 5,408,679 A | 4/1995 | Masuda |
| 5,493,644 A | 2/1996 | Thayer et al. |
| 5,509,028 A | 4/1996 | Marque-Pucheu |
| 5,558,339 A | 9/1996 | Perlman |
| 5,586,247 A | 12/1996 | Yoshifuji et al. |
| 5,586,257 A | 12/1996 | Perlman |
| 5,599,232 A | 2/1997 | Darling |
| 5,608,412 A | 3/1997 | Welles, II et al. |
| 5,618,045 A | 4/1997 | Kagan et al. |
| 5,640,386 A | 6/1997 | Wiedeman |
| 5,646,676 A | 7/1997 | Dewkett et al. |
| 5,654,747 A | 8/1997 | Ottesen et al. |
| 5,682,204 A | 10/1997 | Uz et al. |
| 5,710,719 A | 1/1998 | Houle |
| 5,732,076 A | 3/1998 | Ketseoglou et al. |
| 5,742,289 A | 4/1998 | Naylor et al. |
| 5,742,680 A | 4/1998 | Wilson |
| 5,751,378 A | 5/1998 | Chen et al. |
| 5,790,176 A | 8/1998 | Craig |
| 5,815,146 A | 9/1998 | Youden et al. |
| 5,828,370 A | 10/1998 | Moeller et al. |
| 5,870,665 A | 2/1999 | Uchikawa |
| 5,872,575 A | 2/1999 | Segal |
| 5,884,101 A | 3/1999 | Wu |
| 5,890,055 A | 3/1999 | Chu et al. |
| 5,915,020 A | 6/1999 | Tilford et al. |
| 5,926,208 A | 7/1999 | Noonen et al. |
| 5,956,088 A | 9/1999 | Shen et al. |
| 5,959,592 A | 9/1999 | Petruzzelli |
| 5,974,503 A | 10/1999 | Venkatesh et al. |
| 5,987,376 A | 11/1999 | Olson et al. |
| 5,999,808 A | 12/1999 | LaDue |
| 6,009,060 A | 12/1999 | Kim |
| 6,052,814 A | 4/2000 | Karasawa |
| 6,057,850 A | 5/2000 | Kichury |
| 6,092,117 A | 7/2000 | Gladwin et al. |
| 6,110,041 A | 8/2000 | Walker et al. |
| 6,115,369 A | 9/2000 | Oura |
| 6,132,306 A | 10/2000 | Trompower |
| 6,148,142 A | 11/2000 | Anderson |
| 6,160,993 A | 12/2000 | Wilson |
| 6,166,703 A | 12/2000 | Muterspaugh |
| 6,175,854 B1 | 1/2001 | Bretscher |
| 6,188,571 B1 | 2/2001 | Roganti et al. |
| 6,205,185 B1 | 3/2001 | Kajiwara |
| 6,241,612 B1 | 6/2001 | Heredia |
| 6,263,503 B1 | 7/2001 | Margulis |
| 6,292,589 B1 | 9/2001 | Chow et al. |
| 6,292,847 B1 | 9/2001 | Nishimoto et al. |
| 6,307,567 B1 | 10/2001 | Cohen-Or |
| 6,323,909 B1 | 11/2001 | Michener et al. |
| 6,331,856 B1 | 12/2001 | Van Hook et al. |
| 6,347,216 B1 | 2/2002 | Marko et al. |
| 6,397,038 B1 | 5/2002 | Green, Sr. et al. |
| 6,404,775 B1 | 6/2002 | Leslie et al. |
| 6,409,602 B1 | 6/2002 | Wiltshire et al. |
| 6,412,112 B1 | 6/2002 | Barrett et al. |
| 6,421,385 B1 | 7/2002 | Uenoyama et al. |
| 6,424,817 B1 | 7/2002 | Hadden et al. |
| 6,430,233 B1 | 8/2002 | Dillon et al. |
| 6,445,679 B1 | 9/2002 | Taniguchi |
| 6,466,248 B1 | 10/2002 | Spann et al. |
| 6,473,858 B1 | 10/2002 | Shimomura et al. |
| 6,585,596 B1 | 7/2003 | Leifer et al. |
| 6,594,313 B1 | 7/2003 | Hazra et al. |
| 6,597,891 B2 | 7/2003 | Tantawy et al. |
| 6,600,730 B1 | 7/2003 | Davis et al. |
| 6,614,768 B1 | 9/2003 | Mahany et al. |
| 6,631,410 B1 | 10/2003 | Kowalski et al. |
| 6,650,869 B2 | 11/2003 | Kelly et al. |
| 6,664,969 B1 | 12/2003 | Emerson et al. |
| 6,665,872 B1 | 12/2003 | Krishnamurthy et al. |
| 6,667,944 B2 | 12/2003 | Monden et al. |
| 6,671,186 B2 | 12/2003 | Kopf |
| 6,678,502 B1 | 1/2004 | Sugaya et al. |
| 6,684,058 B1 | 1/2004 | Karacaoglu et al. |
| 6,690,657 B1 | 2/2004 | Lau et al. |
| 6,690,726 B1 | 2/2004 | Yavits et al. |
| 6,690,926 B2 | 2/2004 | Tawil et al. |
| 6,692,359 B1 | 2/2004 | Williams et al. |
| 6,721,280 B1 | 4/2004 | Mauro et al. |
| 6,724,826 B1 | 4/2004 | Varian |
| 6,728,541 B2 | 4/2004 | Ohkura et al. |
| 6,741,841 B1 | 5/2004 | Mitchell |
| 6,745,050 B1 | 6/2004 | Forsythe et al. |
| 6,754,241 B1 | 6/2004 | Krishnamurthy et al. |
| 6,757,913 B2 | 6/2004 | Knox |
| 6,760,487 B1 | 7/2004 | Linares |
| 6,785,262 B1 * | 8/2004 | Yao et al. .................. 370/352 |
| 6,788,882 B1 | 9/2004 | Geer et al. |
| 6,792,615 B1 | 9/2004 | Rowe et al. |
| 6,810,528 B1 | 10/2004 | Chatani |
| 6,811,113 B1 | 11/2004 | Silansky et al. |
| 6,820,218 B1 | 11/2004 | Barga et al. |
| 6,830,515 B2 | 12/2004 | Rowe |
| 6,832,071 B1 | 12/2004 | Nakamura et al. |
| 6,836,658 B1 | 12/2004 | Sharon et al. |
| 6,842,617 B2 | 1/2005 | Williams et al. |
| 6,845,090 B1 | 1/2005 | Takabatake et al. |
| 6,850,285 B2 | 2/2005 | Eaton et al. |
| 6,853,197 B1 | 2/2005 | McFarland et al. |
| 6,856,786 B2 | 2/2005 | Belostotsky et al. |
| 6,859,498 B1 | 2/2005 | Choi |
| 6,873,654 B1 | 3/2005 | Rackett |
| 6,886,029 B1 | 4/2005 | Pecus et al. |
| 6,908,390 B2 | 6/2005 | Nguyen et al. |
| 6,925,285 B2 | 8/2005 | Kim |
| 6,963,353 B1 | 11/2005 | Firestone |
| 6,968,153 B1 | 11/2005 | Heinonen et al. |
| 6,973,667 B2 | 12/2005 | Fritsch et al. |
| 6,993,353 B2 | 1/2006 | Desai et al. |
| 6,996,742 B2 | 2/2006 | Lerman et al. |
| 7,016,419 B2 | 3/2006 | Tardif |
| 7,028,304 B1 | 4/2006 | Weinberger et al. |
| 7,072,627 B2 | 7/2006 | Coffin, III |
| 7,089,319 B2 | 8/2006 | Lysenko et al. |
| 7,099,388 B2 | 8/2006 | Cooper |
| 7,155,515 B1 | 12/2006 | Brown et al. |
| 7,158,679 B2 | 1/2007 | Sano et al. |
| 7,215,660 B2 | 5/2007 | Perlman |
| 7,219,153 B1 | 5/2007 | Day |
| 7,244,181 B2 | 7/2007 | Wang et al. |
| 7,263,125 B2 | 8/2007 | Lainema |
| 7,272,613 B2 | 9/2007 | Sim et al. |
| 7,289,478 B1 | 10/2007 | Kim et al. |
| 7,295,614 B1 | 11/2007 | Shen et al. |
| 7,299,487 B1 | 11/2007 | Campbell et al. |
| 7,340,764 B2 | 3/2008 | Kubota et al. |
| 7,359,004 B2 | 4/2008 | Yu et al. |
| 7,423,990 B2 | 9/2008 | Kelton et al. |
| 7,430,187 B2 | 9/2008 | Holt et al. |
| 7,461,161 B2 | 12/2008 | Horiguchi |
| 7,471,665 B2 | 12/2008 | Perlman |
| 7,477,688 B1 | 1/2009 | Zhang et al. |
| 7,493,078 B2 | 2/2009 | Perlman |
| 7,502,849 B2 | 3/2009 | Roberts et al. |
| 7,543,326 B2 | 6/2009 | Moni |
| 7,548,657 B2 | 6/2009 | Deaven |
| 7,558,525 B2 | 7/2009 | Perlman |
| 7,567,527 B2 | 7/2009 | Perlman |
| 7,587,520 B1 | 9/2009 | Kent et al. |
| 7,590,084 B2 | 9/2009 | Perlman |
| 7,593,361 B2 | 9/2009 | Perlman |
| 7,680,038 B1 | 3/2010 | Gourlay |
| 7,684,752 B2 | 3/2010 | Perlman |
| 7,702,006 B2 | 4/2010 | Kunii et al. |
| 7,715,336 B2 | 5/2010 | Perlman |
| 7,738,391 B2 | 6/2010 | Melpignano et al. |
| 7,841,946 B2 | 11/2010 | Walker et al. |
| 7,848,409 B2 | 12/2010 | Wang et al. |
| 7,878,908 B2 | 2/2011 | Sloate et al. |
| 7,916,147 B2 | 3/2011 | Clemie et al. |

(56) References Cited

U.S. PATENT DOCUMENTS

| | | | |
|---|---|---|---|
| 7,936,376 B2 | 5/2011 | Fukuhara | |
| 8,050,289 B1* | 11/2011 | Masterson et al. | 370/465 |
| 8,147,339 B1 | 4/2012 | Perry | |
| 8,423,071 B1* | 4/2013 | Sun | 455/522 |
| 2001/0007575 A1 | 7/2001 | Mori et al. | |
| 2001/0024974 A1 | 9/2001 | Cohen | |
| 2001/0034743 A1 | 10/2001 | Thomas | |
| 2002/0004838 A1 | 1/2002 | Hakenberg | |
| 2002/0015513 A1 | 2/2002 | Ando et al. | |
| 2002/0019984 A1 | 2/2002 | Rakib | |
| 2002/0028655 A1 | 3/2002 | Rosener et al. | |
| 2002/0034980 A1 | 3/2002 | Lemmons et al. | |
| 2002/0038459 A1 | 3/2002 | Talmola et al. | |
| 2002/0046285 A1 | 4/2002 | Yasushi et al. | |
| 2002/0056120 A1 | 5/2002 | McTernan et al. | |
| 2002/0059614 A1 | 5/2002 | Lipsanen et al. | |
| 2002/0059637 A1 | 5/2002 | Rakib | |
| 2002/0061743 A1 | 5/2002 | Hutcheson et al. | |
| 2002/0068592 A1 | 6/2002 | Hutcheson et al. | |
| 2002/0069265 A1 | 6/2002 | Bountour et al. | |
| 2002/0071658 A1 | 6/2002 | Marko et al. | |
| 2002/0072329 A1 | 6/2002 | Bandeira et al. | |
| 2002/0073429 A1 | 6/2002 | Beane et al. | |
| 2002/0075382 A1 | 6/2002 | Cohen | |
| 2002/0080267 A1 | 6/2002 | Moluf | |
| 2002/0106019 A1 | 8/2002 | Chaddha et al. | |
| 2002/0106119 A1 | 8/2002 | Foran et al. | |
| 2002/0114330 A1 | 8/2002 | Cheung et al. | |
| 2002/0115409 A1 | 8/2002 | Khayrallah | |
| 2002/0118758 A1 | 8/2002 | Sekiguchi et al. | |
| 2002/0128065 A1 | 9/2002 | Chung et al. | |
| 2002/0133491 A1 | 9/2002 | Sim et al. | |
| 2002/0149617 A1 | 10/2002 | Becker | |
| 2002/0152303 A1 | 10/2002 | Dispensa | |
| 2002/0154055 A1 | 10/2002 | Davis et al. | |
| 2002/0157115 A1 | 10/2002 | Lu | |
| 2002/0165927 A1 | 11/2002 | Theriault et al. | |
| 2002/0166119 A1 | 11/2002 | Cristofalo | |
| 2002/0170065 A1 | 11/2002 | Pinnick | |
| 2002/0181189 A1 | 12/2002 | Yang | |
| 2002/0181190 A1 | 12/2002 | Callado | |
| 2002/0184303 A1 | 12/2002 | Uner | |
| 2002/0184314 A1 | 12/2002 | Riise | |
| 2002/0188955 A1 | 12/2002 | Thompson et al. | |
| 2003/0009535 A1 | 1/2003 | Apostolopulos | |
| 2003/0017846 A1 | 1/2003 | Estevez et al. | |
| 2003/0037156 A1 | 2/2003 | Mallart | |
| 2003/0048808 A1 | 3/2003 | Stahl et al. | |
| 2003/0054827 A1 | 3/2003 | Schmidl et al. | |
| 2003/0056168 A1 | 3/2003 | Krishnamachari et al. | |
| 2003/0065805 A1 | 4/2003 | Barnes, Jr. | |
| 2003/0078103 A1 | 4/2003 | LeMay et al. | |
| 2003/0079016 A1 | 4/2003 | Tsao | |
| 2003/0079026 A1* | 4/2003 | Watanabe et al. | 709/228 |
| 2003/0124977 A1 | 7/2003 | Smith et al. | |
| 2003/0135860 A1 | 7/2003 | Dureau | |
| 2003/0139150 A1 | 7/2003 | Rodriguez et al. | |
| 2003/0158700 A1 | 8/2003 | Forler et al. | |
| 2003/0177187 A1 | 9/2003 | Levine et al. | |
| 2003/0181162 A1 | 9/2003 | Matula | |
| 2003/0181229 A1 | 9/2003 | Forster et al. | |
| 2003/0207684 A1 | 11/2003 | Wesel | |
| 2003/0216144 A1 | 11/2003 | Roese et al. | |
| 2003/0220072 A1 | 11/2003 | Coffin, III | |
| 2003/0226149 A1 | 12/2003 | Chun et al. | |
| 2003/0229719 A1 | 12/2003 | Iwata et al. | |
| 2003/0234804 A1 | 12/2003 | Parker et al. | |
| 2004/0003104 A1 | 1/2004 | Boskovic et al. | |
| 2004/0025190 A1 | 2/2004 | McCalla et al. | |
| 2004/0034865 A1 | 2/2004 | Barrett et al. | |
| 2004/0043819 A1 | 3/2004 | Willis | |
| 2004/0048669 A1 | 3/2004 | Rowe | |
| 2004/0052371 A1 | 3/2004 | Watanabe | |
| 2004/0057516 A1 | 3/2004 | Kim et al. | |
| 2004/0064504 A1 | 4/2004 | Domschitz | |
| 2004/0080533 A1 | 4/2004 | Nishtala et al. | |
| 2004/0093372 A1 | 5/2004 | Chen et al. | |
| 2004/0094194 A1 | 5/2004 | Aldoretta et al. | |
| 2004/0097288 A1 | 5/2004 | Sloate et al. | |
| 2004/0102245 A1 | 5/2004 | Escalera et al. | |
| 2004/0110469 A1 | 6/2004 | Judd et al. | |
| 2004/0111755 A1 | 6/2004 | Perlman | |
| 2004/0114576 A1 | 6/2004 | Itoh et al. | |
| 2004/0125820 A1 | 7/2004 | Rios | |
| 2004/0153764 A1 | 8/2004 | Paradkar | |
| 2004/0153933 A1 | 8/2004 | Ejima et al. | |
| 2004/0203694 A1 | 10/2004 | Wong et al. | |
| 2004/0204102 A1 | 10/2004 | Kuehnel et al. | |
| 2004/0224769 A1 | 11/2004 | Hansen | |
| 2005/0071851 A1* | 3/2005 | Opheim | 719/321 |
| 2005/0100100 A1 | 5/2005 | Unger | |
| 2005/0104889 A1 | 5/2005 | Clemie et al. | |
| 2005/0135480 A1 | 6/2005 | Li et al. | |
| 2005/0147164 A1 | 7/2005 | Wu et al. | |
| 2005/0183120 A1 | 8/2005 | Jain et al. | |
| 2005/0188073 A1 | 8/2005 | Nakamichi et al. | |
| 2005/0201460 A1 | 9/2005 | Kang et al. | |
| 2005/0286448 A1 | 12/2005 | Proctor et al. | |
| 2006/0029034 A1* | 2/2006 | Lum | 370/351 |
| 2006/0029065 A1 | 2/2006 | Fellman | |
| 2006/0069623 A1 | 3/2006 | MacDonald Korth et al. | |
| 2006/0078046 A1 | 4/2006 | Lu | |
| 2006/0078051 A1 | 4/2006 | Liang et al. | |
| 2006/0098592 A1 | 5/2006 | Proctor, Jr. et al. | |
| 2006/0111186 A1 | 5/2006 | Hattori | |
| 2006/0116208 A1 | 6/2006 | Chen et al. | |
| 2006/0117344 A1 | 6/2006 | Lamkin et al. | |
| 2006/0117371 A1 | 6/2006 | Margulis | |
| 2006/0136569 A1 | 6/2006 | Tenhunen et al. | |
| 2006/0146830 A1 | 7/2006 | Lin et al. | |
| 2006/0148571 A1 | 7/2006 | Hossack et al. | |
| 2006/0150055 A1 | 7/2006 | Quinard et al. | |
| 2006/0154710 A1 | 7/2006 | Serafat | |
| 2006/0183421 A1 | 8/2006 | Proctor et al. | |
| 2006/0195884 A1 | 8/2006 | van Zoest et al. | |
| 2006/0208959 A1 | 9/2006 | Smith et al. | |
| 2006/0224761 A1 | 10/2006 | Howarth et al. | |
| 2006/0230428 A1 | 10/2006 | Craig et al. | |
| 2006/0242240 A1 | 10/2006 | Parker et al. | |
| 2006/0258463 A1 | 11/2006 | Cugno et al. | |
| 2007/0009015 A1 | 1/2007 | Kunii et al. | |
| 2007/0009029 A1 | 1/2007 | Craig et al. | |
| 2007/0025631 A1 | 2/2007 | Kim et al. | |
| 2007/0047901 A1 | 3/2007 | Ando et al. | |
| 2007/0058937 A1 | 3/2007 | Ando et al. | |
| 2007/0073779 A1 | 3/2007 | Walker et al. | |
| 2007/0094700 A1 | 4/2007 | Wolfe | |
| 2007/0121629 A1 | 5/2007 | Cuijpers et al. | |
| 2007/0136480 A1* | 6/2007 | Stephenson et al. | 709/227 |
| 2007/0147514 A1 | 6/2007 | Yamaguchi et al. | |
| 2007/0156815 A1 | 7/2007 | Mate et al. | |
| 2007/0183493 A1 | 8/2007 | Kimpe | |
| 2007/0202941 A1 | 8/2007 | Miltenberger et al. | |
| 2007/0226364 A1 | 9/2007 | Landspurg | |
| 2007/0260492 A1 | 11/2007 | Feied et al. | |
| 2007/0260677 A1 | 11/2007 | DeMarco et al. | |
| 2007/0271358 A1 | 11/2007 | Gaddy | |
| 2007/0297509 A1 | 12/2007 | Mizobuchi et al. | |
| 2008/0008276 A1 | 1/2008 | Yokoyama | |
| 2008/0025196 A1 | 1/2008 | Karaoguz et al. | |
| 2008/0028458 A1* | 1/2008 | Masuhiro et al. | 726/14 |
| 2008/0032794 A1 | 2/2008 | Ware et al. | |
| 2008/0045338 A1 | 2/2008 | Walker et al. | |
| 2008/0207322 A1 | 8/2008 | Mizrahi | |
| 2008/0211901 A1 | 9/2008 | Cinvanlar et al. | |
| 2008/0220878 A1 | 9/2008 | Michaelis | |
| 2008/0225735 A1 | 9/2008 | Qiu et al. | |
| 2008/0247463 A1 | 10/2008 | Buttimer et al. | |
| 2008/0268947 A1 | 10/2008 | Fyock et al. | |
| 2008/0276269 A1 | 11/2008 | Miller et al. | |
| 2008/0288983 A1* | 11/2008 | Johnson et al. | 725/46 |
| 2009/0003452 A1 | 1/2009 | Au et al. | |
| 2009/0006736 A1 | 1/2009 | Pantos | |
| 2009/0028230 A1 | 1/2009 | Leitner | |

(56) References Cited

U.S. PATENT DOCUMENTS

| | | | |
|---|---|---|---|
| 2009/0109988 A1 | 4/2009 | Musunuri et al. | |
| 2009/0118018 A1* | 5/2009 | Perlman et al. | 463/42 |
| 2009/0144425 A1 | 6/2009 | Marr et al. | |
| 2009/0144792 A1 | 6/2009 | Fielibert et al. | |
| 2009/0198606 A1 | 8/2009 | Craig et al. | |
| 2010/0035691 A1 | 2/2010 | Wild et al. | |
| 2010/0064002 A1 | 3/2010 | Levanon et al. | |
| 2010/0080292 A1 | 4/2010 | Coulombe | |
| 2010/0111410 A1 | 5/2010 | Iu et al. | |
| 2010/0150231 A1 | 6/2010 | Huang et al. | |
| 2010/0226262 A1 | 9/2010 | Liu et al. | |
| 2010/0248843 A1 | 9/2010 | Karsten | |
| 2010/0250770 A1 | 9/2010 | Barreto et al. | |
| 2010/0255901 A1* | 10/2010 | Garvey et al. | 463/25 |
| 2011/0039612 A1 | 2/2011 | Pececnik | |
| 2011/0157197 A1 | 6/2011 | Clemie et al. | |
| 2011/0228845 A1 | 9/2011 | Banerjee | |
| 2012/0075317 A1 | 3/2012 | Clemie et al. | |
| 2012/0198510 A1 | 8/2012 | Stoneback | |

FOREIGN PATENT DOCUMENTS

| | | |
|---|---|---|
| EP | 1104686 | 6/2001 |
| EP | 1202472 | 5/2002 |
| EP | 1837060 | 9/2007 |
| IL | 96-11928 | 12/2006 |
| JP | 09-212661 | 8/1997 |
| JP | 2001111575 | 4/2001 |
| JP | 2001244864 | 9/2001 |
| KR | 20020092022 | 12/2002 |
| WO | WO-96/41479 | 12/1996 |
| WO | WO-97/42766 | 11/1997 |
| WO | WO-0050971 | 8/2000 |
| WO | WO-0141447 | 6/2001 |
| WO | WO-02/060183 | 8/2002 |
| WO | WO-02078369 | 10/2002 |
| WO | WO-03032666 | 4/2003 |
| WO | WO-2006/134055 | 12/2006 |
| WO | WO-2007/130012 | 11/2007 |
| WO | 2009073801 A1 | 6/2009 |
| WO | WO-2010/141492 | 12/2010 |
| WO | WO-2010/141522 | 12/2010 |

OTHER PUBLICATIONS

Office Action from U.S. Appl. No. 12/359,171, Sep. 1, 2010, 7 pages.
Office Action from U.S. Appl. No. 12/538,086, mailed Oct. 7, 2010), 10 pages.
Office Action from U.S. Appl. No. 12/538,076 mailed Oct. 12, 2011, 7 pages.
Office Action from U.S. Appl. No. 12/359,229, mailed Oct. 26, 2011, 8 pages.
Office Action from U.S. Appl. No. 12/359,218, mailed Sep. 13, 2011, 9 pages.
Office Action from U.S. Appl. No. 12/538,090, mailed Jan. 26, 2012, 12 pages.
Final Office Action U.S. Appl. No. 12/359,154 mailed Dec. 13, 2011, 13 pages.
Office Action U.S. Appl. No. 12/359,154 mailed Apr. 11, 2011, 7 pages.
Office Action from U.S. Appl. No. 12/359,127, mailed Mar. 6, 2012, 6 pages.
Office Action from U.S. Appl. No. 12/359,140, mailed Mar. 29, 2011, 6 pages.
Final Office Action from U.S. Appl. No. 12/359,171, mailed May 9, 2011, 18 pages.
Office Action from U.S. Appl. No. 12/359,187, mailed Mar. 29, 2011, 7 pages.
Final Office Action from U.S. Appl. No. 12/359,187, mailed Feb. 14, 2012, 9 pages.
Office Action from U.S. Appl. No. 12/538,077 mailed Aug. 12, 2011, 7 pages.
Office Action from U.S. Appl. No. 12/359,226, mailed Apr. 3, 2012, 7 pages.
Office Action from U.S. Appl. No. 12/359,227, mailed Apr. 10, 2012, 6 pages.
Office Action from U.S. Appl. No. 12/359,150, mailed Mar. 23, 2012, 12 pages.
Final Office Action from U.S. Appl. No. 12/359,140, mailed Mar. 20, 2012, 13 pages.
Office Action from U.S. Appl. No. 12/538,041, mailed Mar. 19, 2012, 9 pages.
Office Action from U.S. Appl. No. 12/359,233, mailed Apr. 20, 2012, 8 pages.
Office Action from U.S. Appl. No. 12/538,054, mailed Jan. 18, 2012, 12 pages.
Office Action from U.S. Appl. No. 12/538,062, mailed May 10, 2012, 13 pages.
Office Action from U.S. Appl. No. 12/538,096, mailed Jun. 26, 2012), 13 pages.
Office Action from U.S. Appl. No. 12/359,218, mailed Jun. 25, 2012, 26 pages.
Office Action from U.S. Appl. No. 12/538,076, mailed Jun. 25, 2012, 21 pages.
Final Office Action from U.S. Appl. No. 12/359,229, mailed Oct. 5, 2012, 2011, 15 pages.
Final Office Action from U.S. Appl. No. 12/538,054, mailed Aug. 24, 21 pages.
Notice of Allowance from U.S. Appl. No. 12/538,041, mailed Sep. 19, 2012, 17 pages.
Notice of Allowance from U.S. Appl. No. 12/359,154 mailed Aug. 28, 2012, 28 pages.
Final Office Action from U.S. Appl. No. 12/538,090, mailed Dec. 4, 2012, 22 pages.
Final Office Action from U.S. Appl. No. 12/359,150, mailed Feb. 4, 2013, 29 pages.
Office Action from U.S. Appl. No. 12/359,150, mailed Jul. 25, 2013, 22 pages.
Office Action from U.S. Appl. No. 12/538,081, mailed Sep. 5, 2013, 26 pages.
Final Office Action from U.S. Appl. No. 12/359,150, mailed Feb. 5, 2014, 27 pages.
Boulware, Jack , "Power Houses", "Wired", Nov. 2002, Issue 10.11, Wired Digital, Inc., 8 pgs., (Nov. 2002).
Bronez, Thomas , et al., "Shipboard experiments for a multishop 802.11 communications system-RF channel characterization and MAC performance measurement", Military Communications Conference, 2005. MILCOM 2005. IEEE. The Mitre Corporation Mclean, VA., (2005), 7 pages.
Everitt, C., "Projective Texture Mapping" nVidia white paper last updated Apr. 24, 2001, 7 pages.
Frauenfelder, M., "G-Cluster Makes Games to Go", The Feature: It's All About the Mobile Internet, http://www.thefeaturearchives.com/13267.html, 3 pages, 2001.
IDS and characterization of references submitted by Inventor in related applications, 7 pages, May 24, 2013.
"Accelerated Graphics Port Interfaces Specification", Intel Corporation, Revision 1.0, Jul. 31, 1996, 161 pages.
"IP Multicast Technical Overview", Cisco Systems, Aug. 2007., 9 pages.
Levoy, M., "Polygon-Assisted JPEG and MPEG Compression of Synthetic Images", Computer and Graphics Proceedings, Los Angeles, Aug. 6-11, 1995, Computer Graphics Proceedings (SIGGRAPH), New York, IEEE, US.
Perry, David , U.S. Appl. No. 61/014,036, filed Dec. 15, 2007, entitled, "Systems and Methods of Serving Game Video", 39 pages.
Setton, E , et al., "Peer-to-Peer Live Multicast: A Video Perspective," Proceedings of the IEEE, vol. 96 Issue: 1, [retrieved May 5, 2010] retrieved from the Internet. <URL: http://ieeexplore.ieee.org/Xplore/login.jsp?reload=true&url=http%3AcYc2F%2Fieeexplo, (Jan. 2008), 25-38 pages.
Wallach, D., et al., "Accelerated MPEG Compression of Dynamic Polygonal Scens", computer Graphics Proceedings, Annual Conference Series, SIGGRAPH, Jul. 24, 1994, 193-196 pages.

(56) References Cited

OTHER PUBLICATIONS

Yoon, et al., "Web Based remote rendering with IBRAC (Image-based rendering acceleration and compression)", European Association for Computer Graphics, 21 Annual Conference, Eurographics, Interlaken, Switzerlmand, Aug. 21-25, 2000, 10 pages.

Final Office Action from U.S. Appl. No. 12/359,150 mailed Sep. 23, 2014, 24 pages.
Office Action from U.S. Appl. No. 12/359,150, mailed May 30, 2014, 21 pages.

* cited by examiner

SYSTEM AND METHOD FOR RETAINING SYSTEM STATE

CLAIM TO PRIORITY

The application is a continuation-in-part and claims the benefit of U.S. Provisional Application No. 61/382,842 entitled, "System and Method for Retaining System State", filed on Sep. 14, 2010.

TECHNICAL FIELD

The present disclosure relates generally to the field of data processing systems and, more particularly, to retaining system state with real-time interactive streaming compressed video.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

DESCRIPTION OF EMBODIMENTS OF THE INVENTION

The assignee of the present application has developed an online video gaming and application hosting system. Certain embodiments of this system are described, for example, in U.S. patent application Ser. No. 10/315,460 (US. Application No. 20040111755), filed Dec. 10, 2002; U.S. patent application Ser. No. 12/538,081, filed, Aug. 7, 2009, entitled, "System and Method for Compressing Video Based on Latency Measurements and Other Feedback"; and U.S. application Ser. No. 12/359,150, filed Jan. 23, 2009, entitled "System And Method for Protecting Certain Types of Multimedia Data Transmitted Over A Communication Channel." These applications are sometimes referred to herein as the "co-pending applications" and are incorporated herein by reference.

Figure 1A:
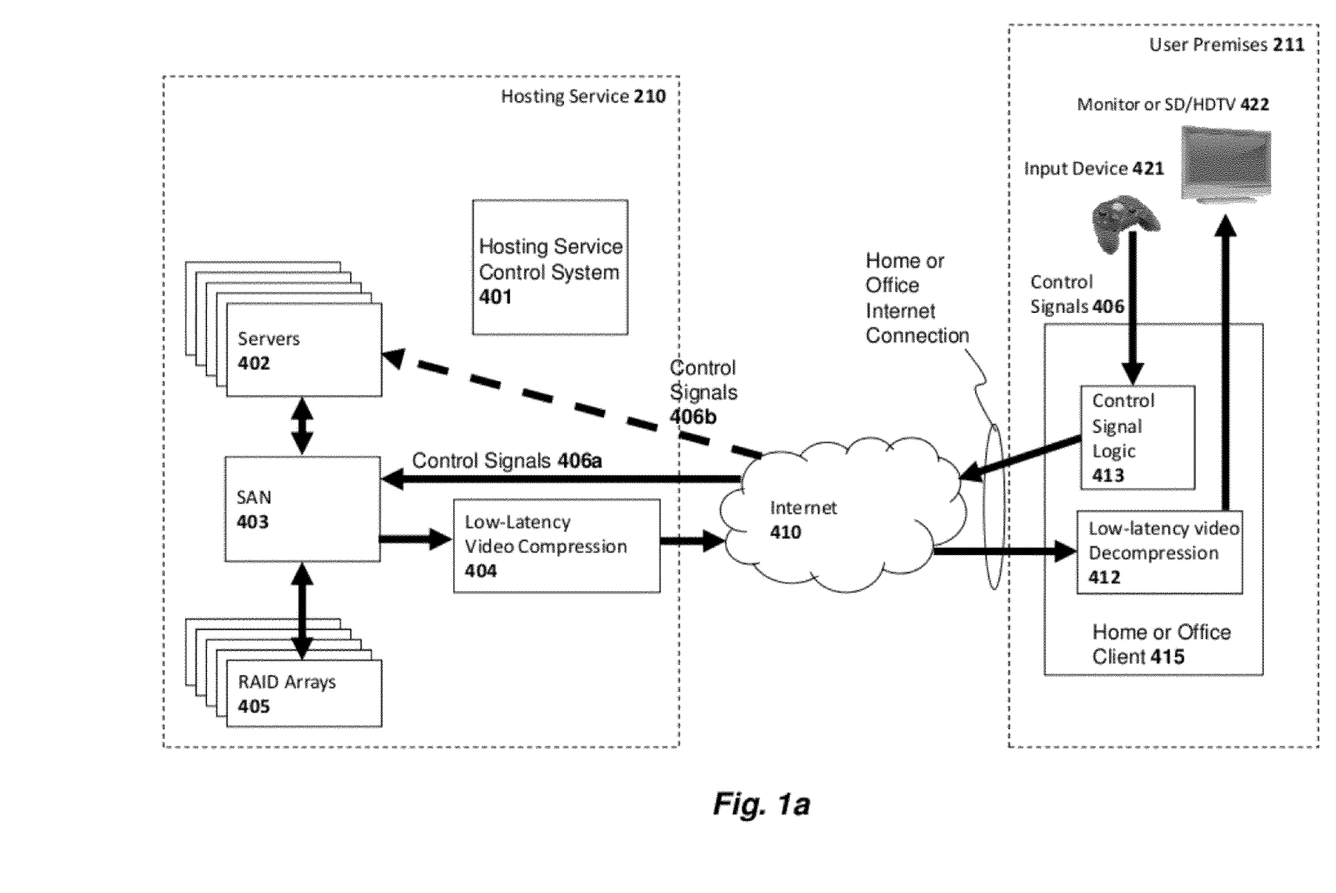
FIG. 1a illustrates a hosting service and a client employed according to one embodiment.

FIG. 4a of U.S. patent application Ser. No. 12/538,081 ('081 application), reproduced in the present application as FIG. 1a, shows a Hosting Service 210 that hosts applications running on Servers 402, that accept input from an Input device 421, received by Home or Office Client 415, and sent through the Internet 410 to Hosting Service 210. The Servers 402 are responsive to the input, and update their video and audio output accordingly, and which is then compressed through Low-Latency Video Compression 404, and the compressed video is then streamed through the Internet 410 to be decompressed by the Home or Office Client 415, and then displayed on Monitor or SD/HDTV 422. This system is an low-latency streaming interactive video system as more thoroughly described in the aforementioned "co-pending applications".

Figure 1B:
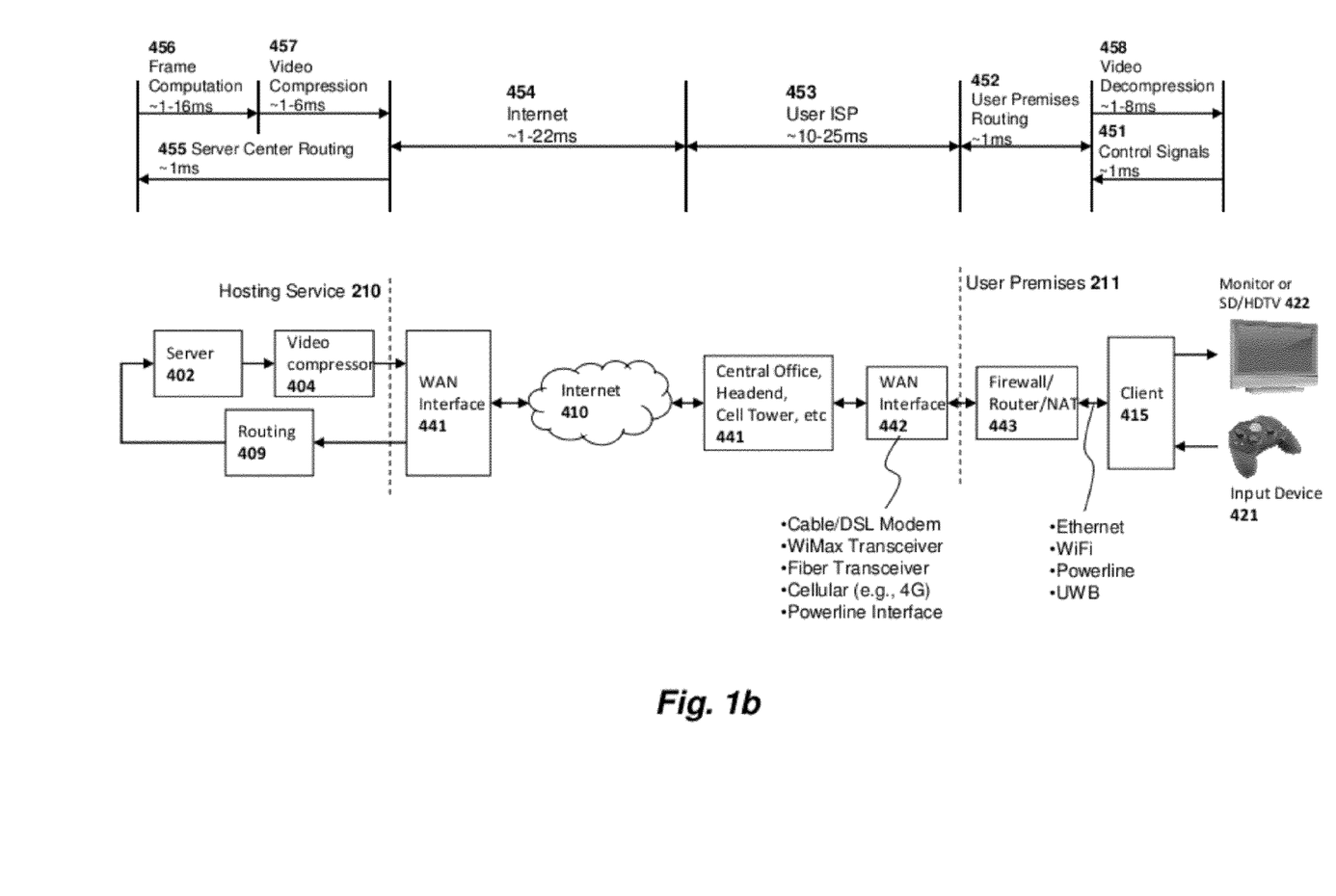
FIG. 1b illustrates exemplary latencies associated with communication between a client and hosting service.
Figure 2:
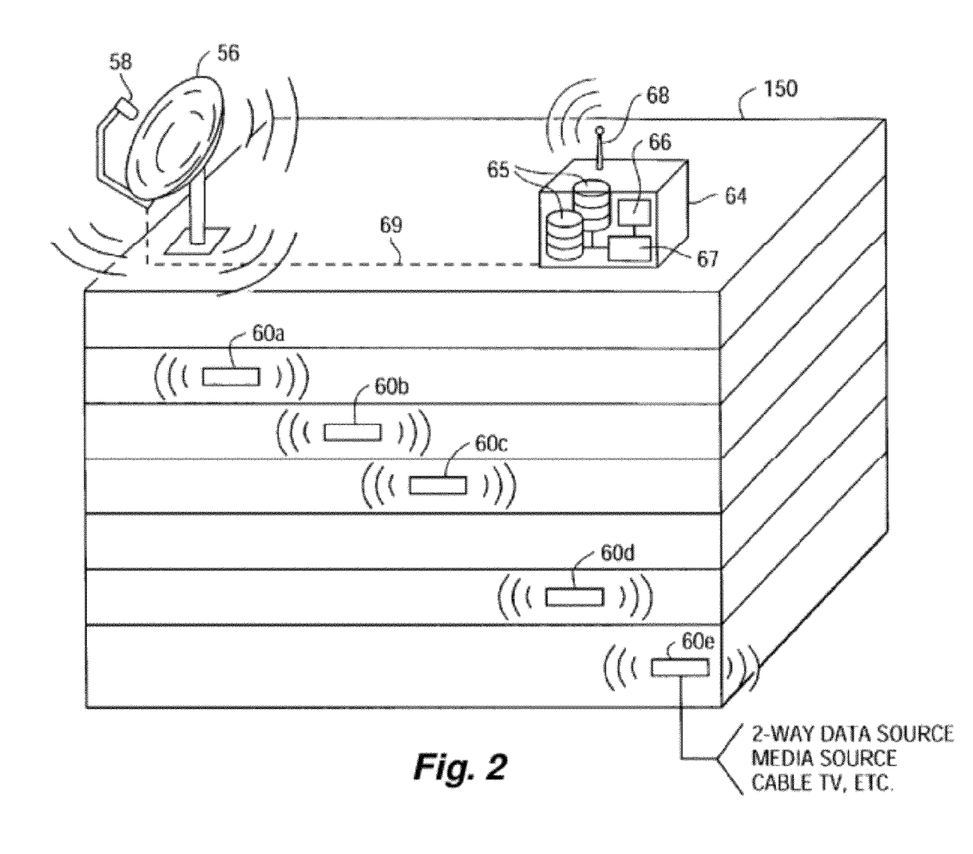
FIG. 2 shows the example of FIG. 4 optionally including a mass storage repository that functions as a media library according to another embodiment of the present invention.

As shown in FIG. 4b of '081, and in FIG. 7 of U.S. patent application Ser. No. 10/315,460 ('460 application), reproduced in the present application as FIG. 1b and FIG. 2, respectively, the network connection between the Hosting Service 210 Home and Office Client 415 may be implemented through a wide range of network technologies, of varying degrees of reliability, such as wired or optical fiber technologies that are typically more reliable and wireless technologies that may be subject to unpredictable interference or range limitations (e.g. Wi-Fi) and are typically less reliable. The '081 application describes techniques to address packet losses and other network impairments that may occur over such network connections. For example, the '081 application includes a section entitled "Dropped or Delayed Packets" which addresses these issues.

Almost all commercial and consumer Internet connections are subject to some impairments some of the time when packets are lost or delayed to the point where they are not usable for the intended application. Often, these impairments do not affect some, but not all, packets, so within a given short time interval (e.g. 1 second) at least some of the packets make it through. But, sometimes, there may be longer intervals (e.g. a minute or more) when either no packets are able to make it through a connection, or the number of packets are so few (in either or both directions) that the throughput of the connection has dropped to the point where it is not practical to send a low-latency compressed video/audio stream of sufficient quality or low enough latency for a given intended application (e.g. as described in the "co-pending applications", some applications can tolerate more impairments than others). Effectively, at this point, the connection is unusable or impaired for carrying low-latency streaming interactive video for the given application.

There are many causes of long intervals where a connection is unusable for a given application. There may be congestion on the network, or a failure in one or more of the routers between the Hosting Service 210 and Home or Office or Client 415. Or, in the case of a wireless connection, there may be interference or congestion from other wireless sources or wireless network users. Also, in the case of wireless, it is possible the Home or Office Client 415 has moved beyond the usable range of the wireless network. Or, if Home or Office Client is a battery-powered device, it may put itself into sleep mode if the battery runs low or if it is preserving power, and during this time it may not be responsive to the network connection for receiving packets. While such intervals sometimes last for a very long duration, frequently such outages are relatively brief (e.g. 5 minutes or less), either because the impairment comes and goes, or because the user takes some action (e.g. moves back within range of a wireless network) to restore an adequate connection for the given application.

During the time the connection is impaired or unusable for the given application, a user's control of the application running on the Servers 402 through the low-latency streaming interactive video system described herein might be impaired or disabled entirely, but once the connection is restored, the user's control of the application would restored. In the case of some applications, for example some video games, if the application does not receive appropriate input from the user for a long interval, or if the user is unable to view and/or hear the video/audio from the application with high enough quality, or if the connection is disconnected entirely, then the application might proceed in an undesirable manner. For example, if the application is a driving game and the car controlled by the user is approaching a sharp turn before a cliff when the network connection is impaired or disconnected such that either the user's control input is unable to appropriately control the car, or if user is unable to see a good enough quality video (or any updated video) to see a sharp turn is coming up so as to provide input to appropriately turn the car, then the car might continue going forward, miss the turn and crash off the cliff.

To address this issue, in one embodiment, if the connection between the Server 402 and the Home or Office Client 415 is unusable or impaired, then the Server 402 pauses the application, until the connection is restored to an adequate level of quality (e.g. if there are impairments, the given application is still usable at given quality level), at which time the user is able to resume the application from where it had been paused. For example, in the driving game example, the game would have been paused prior reaching the sharp turn, and once the connection is restored, the game would be resumed, the user would see the sharp turn coming up, and the user could use the controls to appropriately turn the car upon reaching the sharp turn. As mentioned below, in one embodiment, the client and server may periodically transmit messages to one another to ensure that the connection is usable, or with a sufficient quality level, for the given application. Various different parameters may be used to determine whether the connection is at an adequate quality level. For example, the client or server may measure the latency and/or bandwidth of the connection. If the latency increases above or bandwidth drops below a specified threshold (e.g., a threshold designated for the particular game being played), then the server will pause the game. What is considered an adequate quality level for different applications may vary, and even what is considered an adequate quality level for a given applications may vary. Such quality thresholds may be specified by the developer or publisher of an application or the operator of the Hosting Service 210, each of whom may have a quality standard it wishes to maintain (e.g. for technical, aesthetic, or brand reputation reasons). Also, such quality thresholds may be specified by the user, who may be willing tolerate lower quality in general, or in certain situations (e.g. if stuck at airport waiting for a delayed flight, and only a poor quality network is available). In one embodiment, such quality thresholds may be set by the user, the operator of the Hosting Service 210, or by another party.

In one embodiment, when the connection is restored, the application remains in a paused state, so the user can decide when to resume the application. This is useful, for example, when the user does not know how long it will be before the connection is restored and may not have his or her attention focused on the application when the connection is restored. In one embodiment, a message will be displayed to the user indicating that the connection is once again at an adequate quality level (or that the connection is still not at an adequate quality level if such is the case).

In one embodiment, the application does not pause, but when the connection is restored the user can continue using the application in whatever state it has come to by the time the connection is restored. This could be useful in the case of an application that is a multiplayer game where many people are playing, and it would not be desirable to pause the game for all players because one player's connection is temporarily impaired or lost.

In one embodiment, all input devices are presumed to be in an inactive state when the connection is lost, but otherwise the application proceeds as normal. This may be useful in the case of a 3D design application where the user would not want any input action to continue (e.g. if the connection was lost when a keyboard letter key was in a "down" state, and if it remained in that state, the key would auto-repeat until the connection is restored), but the user would like a long-term rendering task the application is running to continue to run.

In on embodiment, a Server 402 that has lost a connection waits for a certain amount of time for the connection to be restored (e.g. 5 minutes), but if the connection is not restored by that time, then it either (a) terminates the application, (b) saves the user's current state (e.g. position in a game, or state in a productivity application), or (c) saves the user's current state at the last allowed save interval (e.g. in the case of many games, there are only certain points in the game where a user is permitted to save progress in the game).

In one embodiment, the Home or Office Client 415 presents the user with an indicator that shows how much time is left to restore the connection before the application is terminated (e.g. if it 5 minutes, then the user could be presented with a 5 minute countdown timer to know how long there is to restore the connection, or to bother waiting for the connection to be restored).

In one embodiment, the Home or Office Client 415 and Hosting Service 210 send each other periodic messages that indicate that the connection is working well. Thus, if either ceases to receive such messages (or if the messages indicate a problem with the connection), then this will serve as an indication that the connection has become impaired or unusable, and appropriate actions, such as those described previously, can be taken.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

The invention claimed is:

1. A computer-implemented method comprising:
   executing an application on a server in response to user input from a client;

compressing video output from the application to generate interactive compressed streaming video;

transmitting the interactive compressed streaming video generated by the application over a network connection from the server to the client;

detecting by the server that the network connection has become unusable or impaired, wherein detecting that the network connection has become impaired comprises detecting that the network latency has increased above a specified threshold;

pausing, by the server without user input from the client, the execution of the application from a current point of execution and halting transmission of the interactive compressed streaming video in response to detecting by the server that the network connection has become unusable or impaired; and upon detecting by the server that the network connection has become usable or unimpaired, generating a message instructing the user that the connection has become usable or unimpaired;

maintaining, by the server without user input from the client, the application in a paused state until instructed by the user to continue execution; and resuming, by the server, the execution of the application from the current point of execution and resuming transmission of the interactive compressed streaming video, wherein if the connection remains unusable or impaired for a specified period of time, then the server saves a user's current state.

2. The method as in claim 1 wherein detecting that the network connection has become impaired further comprises detecting that the network bandwidth drops below a specified threshold.

3. The method as in claim 2 wherein the specified threshold is based on the bandwidth required to deliver real-time video of the application to the client at a specified resolution.

4. The method as in claim 1 wherein the client periodically transmits messages to the server and/or the server periodically transmits messages to the client to ensure that the connection is usable.

5. The method as in claim 1 wherein the application comprises a video game.

6. A non-transitory machine-readable medium having program code stored thereon which, when executed by a machine, causes the machine to perform the operations of:

executing an application on a server in response to user input from a client;

compressing video output from the application to generate interactive compressed streaming video;

transmitting the interactive compressed streaming video generated by the application over a network connection from the server to the client;

detecting by the server that the network connection has become unusable or impaired, wherein detecting that the network connection has become impaired comprises detecting that the network latency has increased above a specified threshold;

pausing, by the server without user input from the client, the execution of the application from a current point of execution and halting transmission of the interactive compressed streaming video in response to detecting by the server that the network connection has become unusable or impaired; and upon detecting by the server that the network connection has become usable or unimpaired, generating a message instructing the user that the connection has become usable or unimpaired;

maintaining, by the server without user input from the client, the application in a paused state until instructed by the user to continue execution; and resuming, by the server, the execution of the application from the current point of execution and resuming transmission of the interactive compressed streaming video, wherein if the connection remains unusable or impaired for a specified period of time, then the server saves a user's current state.

7. The non-transitory machine-readable medium as in claim 6 wherein detecting that the network connection has become impaired further comprises detecting that the network bandwidth drops below a specified threshold.

8. The non-transitory machine-readable medium as in claim 7 wherein the specified threshold is based on the bandwidth required to deliver real-time video of the application to the client at a specified resolution.

9. The non-transitory machine-readable medium as in claim 6 wherein the client periodically transmits messages to the server and/or the server periodically transmits messages to the client to ensure that the connection is usable.

10. The non-transitory machine-readable medium as in claim 6 wherein the application comprises a video game.

11. An apparatus having a memory for storing program code and a processor for processing the program code to perform the operations of:

executing an application on a server in response to user input from a client;

compressing video output from the application to generate interactive compressed streaming video;

transmitting the interactive compressed streaming video generated by the application over a network connection from the server to the client;

detecting by the server that the network connection has become unusable or impaired, wherein detecting that the network connection has become impaired comprises detecting that the network latency has increased above a specified threshold;

pausing, by the apparatus without user input from the client, the execution of the application from a current point of execution and halting transmission of the interactive compressed streaming video in response to detecting by the server that the network connection has become unusable or impaired; and upon detecting by the server that the network connection has become usable or unimpaired, generating a message instructing the user that the connection has become usable or unimpaired;

maintaining, by the server without user input from the client, the application in a paused state until instructed by the user to continue execution; and resuming, by the apparatus, the execution of the application from the current point of execution and resuming transmission of the interactive compressed streaming video, wherein if the connection remains unusable or impaired for a specified period of time, then the server saves a user's current state.

12. The apparatus as in claim 11 wherein detecting that the network connection has become impaired further comprises detecting that the network bandwidth drops below a specified threshold.

13. The apparatus as in claim 12 wherein the specified threshold is based on the bandwidth required to deliver real-time video of the application to the client at a specified resolution.

14. The apparatus as in claim 11 wherein the client periodically transmits messages to the server and/or the server periodically transmits messages to the client to ensure that the connection is usable.

15. The apparatus as in claim 11 wherein the application comprises a video game.

* * * * *